United States Patent [19]
Moore

[11] 4,098,442
[45] Jul. 4, 1978

[54] PANEL CARRIER

[76] Inventor: Dillon L. Moore, 428 NW. Albermarle Terr., Portland, Oreg. 97210

[21] Appl. No.: 680,911

[22] Filed: Apr. 28, 1976

[51] Int. Cl.² ........................................... B65D 71/00
[52] U.S. Cl. ..................................... 224/45 P; 294/26
[58] Field of Search ............. 224/45 P, 45 M; 294/15, 294/16, 19 R, 2, 26; 292/343, 342; 269/133; 254/131

[56] References Cited

U.S. PATENT DOCUMENTS

| | | | |
|---|---|---|---|
| 1,479,711 | 1/1924 | Haarberg | 294/15 |
| 1,482,056 | 1/1924 | Watkins | 294/26 |
| 1,978,743 | 10/1934 | Ellis | 254/131 |
| 2,195,667 | 4/1940 | Baker | 254/131 |
| 2,428,941 | 10/1947 | Packard | 224/45 P |
| 2,430,142 | 11/1947 | Roberts | 224/45 P |
| 3,463,533 | 8/1969 | Repiscak et al. | 294/26 |
| 3,477,598 | 11/1969 | Hassell et al. | 294/19 R |
| 3,642,251 | 2/1972 | Niederholtmeyer | 294/15 |
| 3,940,171 | 2/1976 | Carlsson | 224/45 P |
| 3,945,065 | 3/1976 | Dushku | 294/26 |

FOREIGN PATENT DOCUMENTS

| | | | |
|---|---|---|---|
| 389,093 | 2/1924 | Fed. Rep. of Germany | 254/131 |

*Primary Examiner*—Trygve M. Blix
*Assistant Examiner*—Kenneth Noland
*Attorney, Agent, or Firm*—Kolisch, Hartwell, Dickinson & Stuart

[57] ABSTRACT

A panel carrier for facilitating the manual transport of panels and glass sheets including a handle, an elongate member having a first end connected to the handle, a panel receiving and supporting ledge connected to the other end of the handle and pointed members disposed adjacent the supporting ledge. Additionally, a resilient bumper is provided adjacent to the handle so that fragile panels such as glass sheets may be supported without damage. The pointed members are used to frictionally engage a panel which is situated on top of a stack in order to slide the panel therefrom or to engage the edge of a panel opposite the user and to aid in lifting said opposite edge toward the user.

1 Claim, 5 Drawing Figures

PANEL CARRIER

BACKGROUND OF THE INVENTION

The present invention relates to devices used to facilitate the manual handling of panels or other large, substantially flat articles, and more particularly to an improved panel carrier which may be used to slide panels off a stack, lift panels from horizontal positions, and transport fragile panels.

In the building construction industry, it is often the case that stacks of plywood, gypsum board and other large, relatively thin, flat sheets, or panels, are delivered to a construction site stacked one on top of another. In order to remove a top panel from the stack, the panel must be moved or slid laterally along the top of the next panel such that an edge of the panel to be removed is free from grabbing by a workman. The panel may then be lifted and shifted for carrying. With large, heavy panels, such movement by a workman or workmen can prove to be very burdensome due to panel weight and stack height. Furthermore, there is the danger of a workman's fingers becoming lodged between that panel being slid and the next panel such that injury might result.

It may also be desirable to tilt a horizontally situated panel to an upright position for carrying without sliding the panel. Presently, in order to effectuate such an upward tilt, workmen must bend over and grab one of the panel's longitudinal edges and then lift it from a horizontal to an upright position. Once the panel is in an upright position, it may be transported to a desired location. It can be appreciated that constantly bending over and lifting loads is extremely wearisome and can cause injury to back muscles, etc.

With respect to known panel carriers, such carriers are not adapted to transport fragile panels, such as large glass sheets, without the sheets bumping against the carrier itself or an individual's hands. If a fragile panel is bumped too severely against its carrier during transport, it may become damaged. Additionally, known panel carriers are not provided with any means for aiding a workman in laterally sliding a panel off the top of a stack of panels. A panel carrier, if modified so that it could be extended across the top of an uppermost stacked panel and secured to a panel face so that the panel could be slid off, would greatly aid workmen.

Panel carriers known in the art may take several forms. One form is exemplified in U.S. Pat. No. 3,203,606 which describes a carrying rod for wallboard panels. Basically, it is an elongate rod having a handle attached at one end thereof and incorporates a foot at the other end. An upright panel is placed on top of the foot with the elongate rod extending upwardly along an outer face of the panel. An individual then extends his arm over the side of the panel, grasps the handle and lifts the carrier thereby also lifting the panel. The panel may then be manually transported to a desired location.

In U.S. Pat. No. 2,428,941 there is disclosed a panel carrier having a handle guard provided to maintain carried panels spaced from the handle. This patent describes such a handle guard as being preferably in the form of a U-shaped yoke having legs and a plate member. However, it is to be noted that the described handle guard does not include any yieldable surface suitable for transporting glass sheets or the like.

While not directly related to panel carriers, U.S. Pat. No. 1,881,194 sets forth an elongate handle having a U-shaped body at one end thereof with a pair of spaced parallel coextensive tines. One of the tines is provided with a curved hook which terminates in a sharpened point, the hook being substantially parallel to the handle. Because the hook is parallel to the handle, it is apparent that such a device could not be used to reach across a stack of panels such that the hook could be embedded in the panel for dragging such a panel off of a stack.

SUMMARY OF THE INVENTION

The present invention provides a panel carrier used to facilitate the manual transportation of large, relatively flat and thin sheets or panels of material such as plywood, gypsum board, glass sheets and the like. The panel carrier of the present invention includes a handle attached to one end of an elongate member, the other end of the elongate member being secured to a panel receiving and supporting portion. The panel receiving portion includes a ledge which extends substantially perpendicularly to the elongate member and further includes a retainer section to keep an upright panel from slipping off. The improved panel carrier includes pointed members or spikes disposed opposite of the ledge for frictionally engaging the top surface of a horizontally positioned panel in order to slide such panel from a stack.

Additionally, the improved panel carrier of the present invention includes a bumper disposed adjacent the handle which is constructed at least partially of resilient material so that a glass sheet or other fragile panel may be held against the bumper and allowed to move against the same without damage to the panel or glass sheet.

It is a general object of the present invention to provide an improved panel carrier which may be extended across an uppermost one of a stacked plurality of panels such that pointed members disposed on the carrier may frictionally engage a surface of the panel so that a worker may pull or laterally slide a panel somewhat off the stack so that the panel may be grasped by its edges for further movement, tilting, etc.

It is another object of the present invention to provide an improved panel carrier wherein the aforementioned spikes are configured to permit a panel lying substantially flat to be tilted upwardly by engaging an edge, such as a longitudinal edge of the panel, with the pointed members so that when a worker exerts a pulling force on the carrier, the engaging spikes permit the panel to be tilted upwardly to a vertical or other desired position.

Yet another object of the present invention is to provide an improved panel carrier having a yieldable bumper disposed adjacent to the carrier's handle so that glass or other relatively fragile panels may abut against a resilient surface so that damage to such glass or panels during transport is prevented.

Additional objects of the present invention reside in the specific construction of the preferred embodiment hereinafter particularly described in the specification and shown in the drawings.

BRIEF DESCRIPTION OF THE DRAWINGS

Novel features of the improved panel carrier device in accordance with the present invention will be more readily understood from a consideration of the following description taken together with the accompanying drawing, in which a preferred embodiment is illustrated with the various parts thereof identified by suitable reference characters in each of the views, and in which.

DETAILED DESCRIPTION OF THE INVENTION

Figure 1:
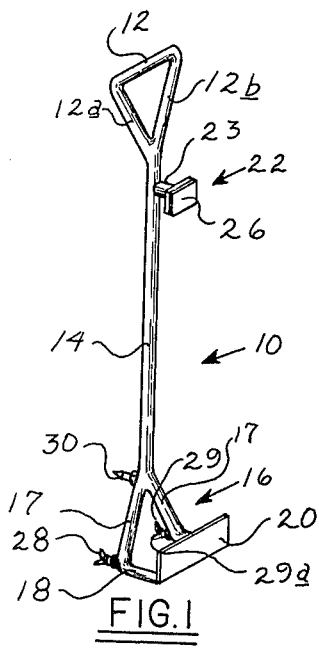
FIG. 1 is a perspective view of the panel carrier of the present invention in upright position preparatory to receiving a panel for transport.

Turning now to the drawings, an improved panel carrier in accordance with a preferred embodiment of the present invention is generally designated at 10. Panel carrier 10 includes a handle 12 having members 12a and 12b which are connected to an elongate member 14. The elongate member 14 is connected to a panel receiving portion generally designated at 16. The panel-receiving portion 16 includes a pair of legs 17 rigidly secured to a pair of ledge bars 18. The ledge bars 18 extend outwardly from legs 17 and support at their forward ends an upwardly-extending plate or retaining member 20 which is spaced-apart from the elongate member 14. The ledge bars 18 and the retaining member 20 together form a ledge means for supporting a panel along its lower edge. As can be appreciated from the drawings, the ledge bars 18 provide a horizontally-extended base dimensioned for preventing the panel from tilting in a vertical plane when it is carried, and the retaining member 20 prevents the panel from slipping off the forward ends of the ledge bars. As shown in FIG. 1, the improved panel carrier 10 may be constructed from rod members appropriately welded or otherwise secured together.

Figure 3:
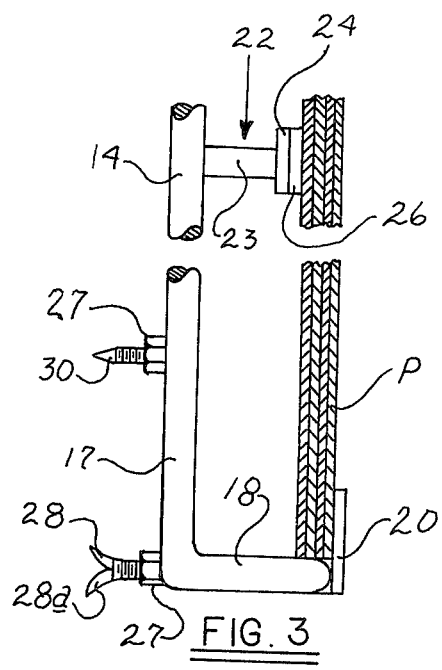
FIG. 3 is a view taken along lines 3—3 of FIG. 2 and illustrates the positioning of a panel against the bumper and the retainer on the panel receiving portion.

Specific improved features of the panel carrier 10 in accordance with the principles of the present invention are further detailed in FIG. 3. Specifically, a bumper or resilient means 22 includes a rigidly mounted member 23 which extends substantially perpendicularly from the elongate member 14 adjacent to the handle section 12. Resilient means 22 further includes a support plate 24 to which is attached a resilient, yieldable, material 26. Further improvements include a plurality of projecting means or pointed members such as sharpened spikes 28, 29 and 30 which are provided adjacent to the panel receiving portion 16, opposed in direction to the support ledges 18. The spikes 28 and 29 are sharpened bolts which are threadedly attached to the legs 17 and secured thereto by nuts 27 welded to legs 17. The spike 30 is likewise attached to the elongate member 14. As can be seen from a consideration of FIGS. 1 and 3, the spikes 28, 29 have pointed end portions which are disposed at an angle with respect to legs 17. Furthermore, additional pointed spike end portions 28a, 29a may also be provided disposed obliquely to legs 17 but in the opposite direction of spike end portions 28, 29. The purpose of such oblique placement will be described later.

Figure 2:
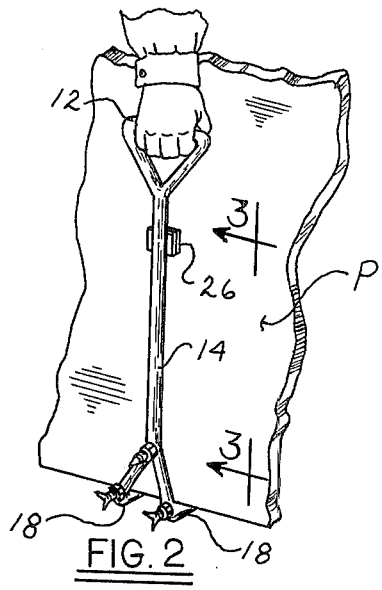
FIG. 2 is a partial view of a panel and a worker showing how the panel carrier is situated on one side of a panel and how a worker's hand grabs the handle so that a panel is supported at the bottom of the panel carrier for transporting.

From a consideration of FIGS. 2 and 3, it may be readily appreciated how the bumper 22 aids in preventing damage during the transport of fragile panels such as a sheet of glass. In FIG. 2, there is shown a panel "P" supported on ledges 18 and disposed against the yieldable material 26 of the bumper 22 as by the side of a worker's body when he is transporting the panel. While FIG. 3 shows a plywood panel P, it can be readily appreciated that a glass sheet may be more readily transported and protected by bearing against the yieldable material 26. Furthermore, the member 23 spaces the yieldable material 26 a predetermined distance from the elongate member 14. As a consequence, a worker's knuckles or fingers will not contact or rub against panel material being transported.

Figure 4:
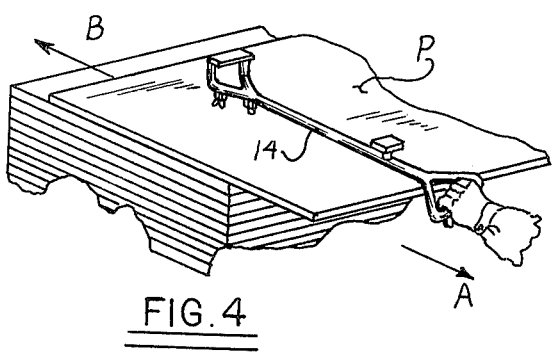
FIG. 4 is a partial view of a stack of panels wherein the improved panel carrier of the present invention is shown with the pointed members frictionally engaging a top panel so that such panel may be laterally shifted from the stack.

With attention now directed to FIG. 4, it can be seen that spikes 28, 29 and 30 are employed to rapidly and effectively aid in laterally shifting a nonglass panel P from atop a stack of panels. For instance, if it is desired to laterally shift panel P, a worker positions the panel carrier 10 such that at least one of spikes 28, 29 or 30 partially penetrate into the panel surface. If a force is then directed by the worker in the direction of arrow "A", the panel P will laterally shift in such direction. Thereupon, the worker may disengage spikes 28, 29 and 30 from contact and panel P may be tilted vertically and placed in the panel receiving portion 16 for transport by the worker. Thus, it is readily apparent that a worker will not risk catching his fingers between a panel being laterally shifted and the lower panels. Furthermore, only one worker will be required to shift a panel from a stack instead of the customarily required two or more workers.

The oppositely angled spikes 28a, 29a, are used when it is desired to shift a panel in the direction "B" as shown in FIG. 4. The spikes 28, 29, 28a and 29a are angled with respect to the member 14 so that they will not become dislodged when a panel is being laterally shifted.

Figure 5:
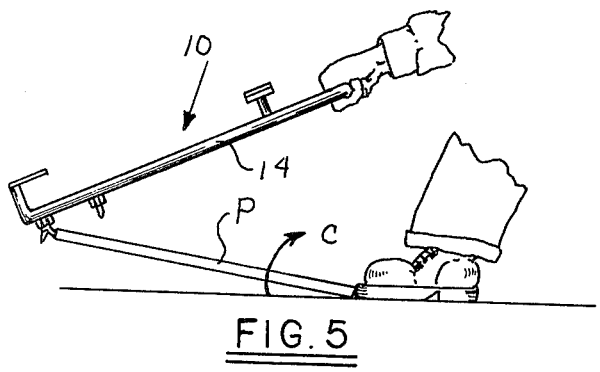
FIG. 5 is a partial view of a worker utilizing the improved panel carrier of the present invention engaging the pointed members against an edge of the panel such that the panel may be tilted from a horizontal to an upright or vertical position.

FIG. 5 illustrates how spikes 28, 29 may be employed to lift a panel P from a horizontal position to a vertical position. A worker reaches across a panel and hooks spikes 28, 29 along a longitudinal edge thereof opposite the worker. The worker may then place the front of his shoe against the edge nearest him and exert a pulling force along the axis of the member 14 such that the panel P will pivot generally in the direction of an angle C and be moved from a horizontal to a vertical position. The panel may then be placed on support ledges 18 and transported as shown in FIG. 2. Because the improved panel carrier 10 incorporates the elongate member 14, it can be seen that a worker does not need to bend over an excessive amount in order to lift a panel. Consequently, back strain and fatigue may be substantially alleviated while the mechanical advantage inherent in using the panel carrier 10 readily affords a quick and efficient method of upwardly tilting a horizontally positioned panel.

Thus, from the foregoing description, it can be seen that the improved panel carrier 10 of the present invention not only facilitates the transport of large panels, such as sheet rock and gypsum board, but also is effective in transporting large sheets of fragile panels such as glass without damaging or chipping because of the provision of bumper 22. Furthermore, it can be appreciated that the novel spike configuration enables a single worker to quickly and substantially effortlessly shift large, heavy panels laterally across a stack of panels or tilt panels upwardly from the ground. The aforementioned features will greatly aid construction workers in moving panels of building construction materials or glass from stacks to their ultimate locations on construction job sites.

While the invention has been particularly shown and described with reference to the foregoing preferred embodiment, it will be understood by those skilled in the art that changes in form and detail may be made therein without departing from the spirit and scope of the invention as defined in the appended claims.

What is claimed is:

1. A carrier for facilitating the substantially upright, manual transport of a panel comprising:

a handle;

an elongate member having a first end thereof connected to said handle;

ledge means rigidly secured to the other end of said elongate member and projecting therefrom, said ledge means including a base dimensioned for supporting a panel in upright position along an edge thereof while preventing it from substantial tilting movement in a vertical plane, and a retaining member connected to said base and extending upwardly therefrom, said retaining member being spaced apart from said elongate member;

at least one pointed member disposed adjacent said ledge means for at least partially penetrating a face of a substantially horizontally disposed panel so that the panel may be laterally shifted when a force is directed along the axis of said elongate member;

at least one additional pointed member disposed adjacent said elongate member and angled away from said handle; and resilient means rigidly mounted adjacent the first end of said elongate member and projecting a fixed distance therefrom for providing a cushion against which a panel may abut when the panel is being transported.

* * * * *